US011233638B1

(12) United States Patent
Liushits et al.

(10) Patent No.: US 11,233,638 B1
(45) Date of Patent: Jan. 25, 2022

(54) SECURED ELECTRONIC TOKEN REGISTER SYSTEM

(71) Applicants: Anton Jakovlevich Liushits, Minsk (BY); Alexander Vladimirovich Vlasov, Moscow (RU)

(72) Inventors: Anton Jakovlevich Liushits, Minsk (BY); Alexander Vladimirovich Vlasov, Moscow (RU)

(73) Assignees: Alexander Vladimirovich Vlasov, Moscow (RU); Anton Jakovlevich Liushits, Minsk (BY)

( * ) Notice: Subject to any disclaimer, the term of this patent is extended or adjusted under 35 U.S.C. 154(b) by 0 days.

(21) Appl. No.: 16/998,699

(22) Filed: Aug. 20, 2020

Related U.S. Application Data

(60) Provisional application No. 62/889,295, filed on Aug. 20, 2019.

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/3213* (2013.01); *H04L 2209/56* (2013.01)

(58) Field of Classification Search
CPC ..... H04L 9/085; H04L 9/0825; H04L 9/3213; H04L 2209/56
USPC ....... 380/77, 285, 282, 44, 30, 255; 713/189
See application file for complete search history.

(56) References Cited

U.S. PATENT DOCUMENTS

2013/0272521 A1* 10/2013 Kipnis ................. H04L 9/0833
380/44

* cited by examiner

*Primary Examiner* — Izunna Okeke
(74) *Attorney, Agent, or Firm* — Bardmesser Law Group

(57) ABSTRACT

Method for generating cryptotokens including identifying an asset; using a secret sharing algorithm, creating a token that corresponds to the asset, wherein the token represents a private key and comprises a first half and a second half; on the client side, generating first half of public key and first half of private key; transmitting first half of public key to a server; on the server, using first half of public key to generate a second half of private key; generating second half of public key using second half of private key; associating the asset with the token; access to the asset requires the first second halves of the private key; performing a transaction with the asset by transferring first half of private key from first user to second user, and re-associating the asset from first to second user; first half of private key is never stored together with second half.

4 Claims, 10 Drawing Sheets

SECURED ELECTRONIC TOKEN REGISTER SYSTEM

CROSS REFERENCE TO RELATED APPLICATIONS

This application claims priority to U.S. Provisional Application No. 62/889,295, filed on Aug. 20, 2019.

BACKGROUND OF THE INVENTION

Field of the Invention

The present invention relates to a Secured Token Electronic Register System (STERS), hereinafter the System, Secured System, or Register.

Description of the Related Art

Various fintech services can be created based on secure electronic token register system (SARS) such as: payment systems (including interbank systems), exchange and OTC platforms, custody services, etc.

SARS architecture is more reliable than existing mechanisms for worked with fiat and crypto currencies and ensured distributed creation and storage tokens. And also increase the reliability of the exchanges, OTC and Custody built on SARS, because there is no point in hacking them and there is no point in deception by the services themselves.

Accordingly, there is a need in the art for a system architecture does not impose any restrictions on the number and speed of transactions. there is a need in the art for a system that can use the public infrastructure of communication networks (such as Internet), which, together with low computing power, provides low costs for the user and the served transaction.

SUMMARY OF THE INVENTION

In one aspect, a method for generating tokens for transactions involving an asset, the method including identifying an asset that can be traded or exchanged in digital form; using a secret sharing algorithm, creating a token that corresponds to the asset, wherein the token represents a private key and comprises a first half and a second half; on the client side, generating a first half of a public key and a first half of the private key; transmitting the first half of the public key to a server; on the server, using the first half of the public key to generate a second half of the private key; generating the second half of the public key using the second half of the private key; upon entry of the asset into a system database, associating the asset with the token, such that access to the asset requires the first half and the second half of the private key; performing a transaction with the asset by transferring the first half of the private key from a first user to a second user, and changing an association of the asset from the first user to the second user, wherein the first half of the private key is never stored together with the second half of the private key.

Optionally, the method includes generating the public key by multiplying the second half of the private key by the first half of the public key, and using the public key to verify information about the asset (for example, current price, owner, nominal value, account balance, rights ownership, dates of ownership, etc.). Optionally, the method includes generating the public key by multiplying the second half of the private key by the first half of the public key, and wherein each asset corresponds to a database entry matching the token, such that the public key is used to query the database about properties of the asset (for example, current price, owner, nominal value, dividend history, payable dividend and/or interest, account balance, rights ownership, dates of ownership, prior dates of transfer, physical properties of precious stones, real estate GPS location/address/square footage/number of rooms, and so on).

Additional features and advantages of the invention will be set forth in the description that follows, and in part will be apparent from the description, or may be learned by practice of the invention. The advantages of the invention will be realized and attained by the structure particularly pointed out in the written description and claims hereof.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention.

1.1. Definitions:

1.1.1. Secured token electronic register system (STERS) is an innovative way to procure storage and implementation of the rights of legally capable persons for their Assets by using a specialized software. From a technical standpoint, the System is an information resource comprised of a system for creation, registration, accounting, and redemption of Tokens, as well as for storing of parts thereof and entries in the prescribed format, concerning these Tokens and their underlying Assets.

1.1.2. Token is a digital entry, which unambiguously certifies (i.e., identifies and confirms) that the Token bearer wields the right of disposal for some Asset.

1.1.3. Asset is any individually defined or non-defined property (including any kind of legal tender), as well as any rights pertaining to economic relations between subjects, or any intangible assets, such as crypto-currencies, property titles, securities, personal data, etc.

2. Fundamental Functions of the System 2.1. STERS has the following functionality:

creation of Tokens (tokenization) based on the given asset;

storing of Tokens (i.e., distributed storage of tokens);

modification of Token register entries (accounting), including cancellation (redemption) of Tokens.

2.2. Creation of Tokens

Figure 1:
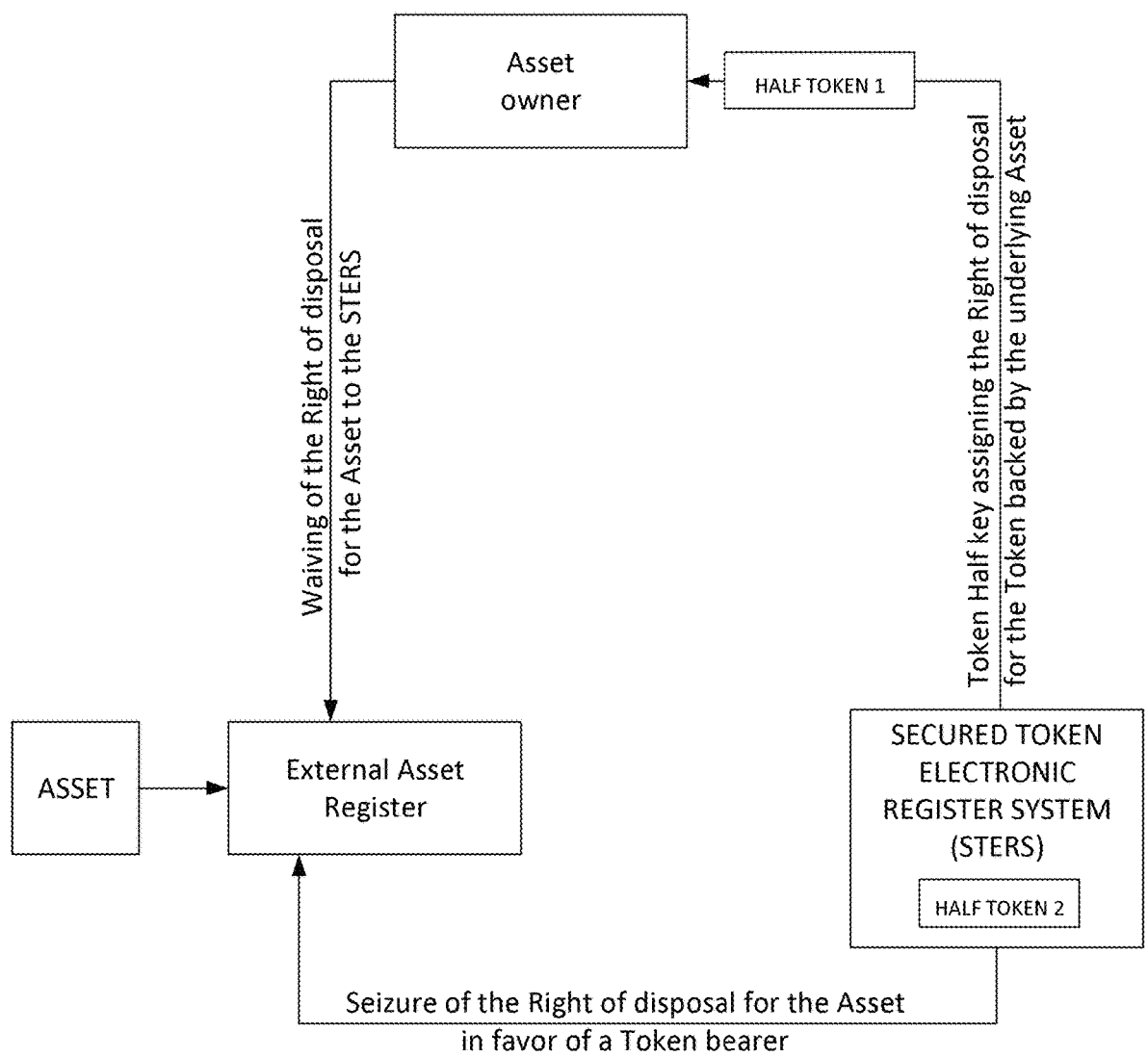
FIG. 1 illustrates shows a diagram of transfer rights of disposal when tokenizing assets.

Tokenization (Token creation) is a process of electronic generation of unique identifiers that confirm the bearer's (owner's) right of disposal for the Asset, as well as the process of generation of an electronic entry for the Asset, the rights for which are certified (i.e., identified and confirmed) by the Token, where the right of disposal for the underlying Asset is alienated in favor of the Token bearer, both technically and legally. This is shown in FIG. 1.

Token creation involves of key pairs—public and private—where the private key is generated in two separate halves using the group properties of asymmetric cryptographic code's structures One half is generated in the System; the other half is generated in and by the software application of the client (of the user of the System). Thus, from a technical standpoint, a Token (i.e., unique ID that certifies the right of disposal for the Asset) is a set of two halves of the private key, which have been generated separately and are stored separately, and the corresponding public key.

From a financial and legal standpoint, tokenization is a segregation of the right of disposal disposal for an arbitrary Asset (underlying the Token) and assigning of that right of disposal to a person, who is able to present both public and private keys of the Token to the System. In other words, legally speaking, the person submitting his Asset for Tokenization alienates his right of disposal for that Asset, while the person acquiring the Token (as a title) receives the above-mentioned right indirectly, through the right of disposal for the Token, which consequently certifies that its bearer wields the right of disposal for the Asset.

Based on the fact that a person is the bearer of the Token, it is possible to certify (i.e., identify and confirm) that the person wields the title and/or right of disposal for the underlying Asset, as well as to provide for exercising the right (for instance, for transferring it to another person).

Initial data describing the Asset that are used for Tokenization may include both data obtained from internal and external information systems, such as crypto-currency block-chains, transport or storage documentation, escrow account receipts from banks, securities depository receipts, property register entries, etc.

2.3. Storage of Tokens

Distributed storage of Tokens originates from the nature and features of the technology used for their creation (which is one of the things that distinguishes the present System). Since both halves of the private key are generated separately, i.e., one half is generated by the System, and the other half is generated by the client app, at no time during the Token's "lifetimes" there is a single device or related storage that would store both halves of the private key. Meanwhile, the register entry that describes the Asset represented by the Token may also be encrypted and/or distributed using the block-chain technology and/or other means.

The Token bearer can be identified using the public key that corresponds to both halves of the private key.

The System stores all modifications of Token Register log entries, by means of using the block-chain technology, however other options are also possible.

2.4. Modification of Token Register entries

Token Register log entries are modified during the following events:

a new Token is created;

the Token bearer is changed;

the Token has been redeemed.

A new Token can be created by a user (client) of the System who is able to prove to the System the fact of alienation of his rights of disposal for a certain Asset, which is underline the new Token. Based on the data on the Asset and after proving the fact of alienation of the right of disposal for it, a new correspondent Token entry is generated in the System Register log, containing a half of the private key or a link to where it is stored, along with the Token bearer's ID and system data. In particular, the System stores data about the Asset that may be also encrypted, and procures its safety for reversibility of Tokenization, i.e., to provide for Token redemption (see below). The other half of the private key is generated by the software application installed on the user's device.

The Token bearer may be changed by a user of the System who presents his half of the private key, which corresponds to the Token (i.e., a transaction initiator). When the Token bearer is changed, the current bearer's (transaction initiator's) ID is replaced in the Register log with the ID of the recipient—user who receives the Token. Also, the system data are updated. However, the half of the private key that is stored in the System is left unchanged, while the other half of the private key is passed from the transaction initiator to the recipient in such a way that guarantees the transaction initiator to completely forfeit his ability to dispose this half of the Token's private key.

A Token can be redeemed by a user of the System who presents his half of the private key, which corresponds to a specific Token (i.e., a redeeming user). Then the other half of the private key that is stored in the System is transferred to the redeeming user, while also being completely deleted from the Register. However, the system data and event log concerning the Token entry are kept. After that, no transaction can be made with the redeemed token, since it has been removed from the System. By redeeming the Token, the user holding both halves of the private key is able to actually manage the underlying Asset.

From a legal standpoint, Token redemption is a reverse of the Tokenization procedure. It implies alienation of the rights of disposal for the Asset in favor of the Token redeeming user. At the moment of its redemption the Token as title ceases to exist, both technically and legally.

3. Architecture of the System 3.1. In order to perform all the functions listed in 2.1, it is enough for the System to comprise at least the following components, or equivalents thereof, capable of implementing the following functionality:

3.1.1. Client Application, which is a piece of software used for:

accessing the System (to identify and confirm the user's authority);

getting permitted information from the components of the System or external information systems;

instructing the System to perform permitted (authorized) operations (transactions), such as token generation, transfer, storage, and redemption.

3.1.2. Tokenization subsystem, which is a software module of the System that provides for generation, transfer with deletion, and redemption of halves of the Token private keys;

3.1.3. Storage subsystem, which is a hardware and software module of the System that physically stores halves of the token private keys;

3.1.4. Register subsystem, which is a centralized (or distributed) database that keeps track and registers operations with Tokens;

3.1.5. External communications subsystem, which is a software module that provides for interaction between the subsystems of the STERS, external information systems, and Client Applications;

3.1.6. External information systems, which are centralized (or distributed) databases, registers or other information systems, the data (entries) from which can be used to create Tokens and/or get information about underlying Assets and their owners (administrators), and which also include external information systems that receive statistics, reports and other documentation from STERS.

3.2. This set of components of the System enumerated in 3.1 above is sufficient but the system is not necessarily limited to using these components. The specific embodiment of the System depends on the way and field it is used in. Therefore, certain components or parts thereof can be rearranged into one or several different modules. For instance, the Tokenization subsystem can be combined with the Storage subsystem or Register subsystem into a single software solution. Therefore, the pivotal role there is played not by the specific function sets assigned to certain modules, but by the assortment of functions to be performed by the components of the System in general and the rules governing interaction between the components.

3.3. The structural (block) diagram (for the proposed arrangement of functionality) is shown in FIG. 2.

Figure 2:
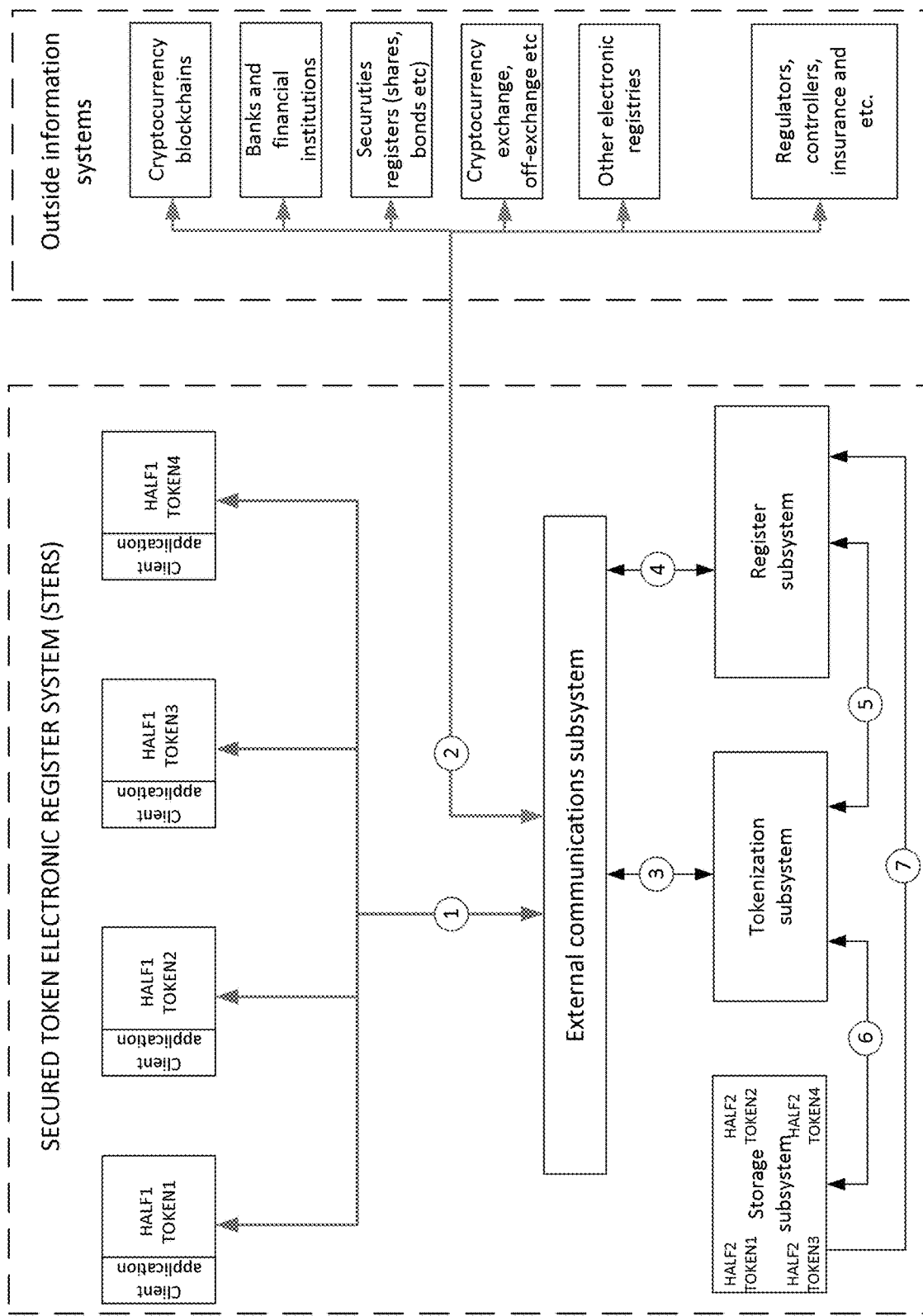
FIG. 2 illustrates a structural (block) diagram for the proposed arrangement of functionality.

Diagram key for FIG. 2 is as follows:

1—Communication channels and data transfer protocols that provide for information exchanges between the external communications subsystem and client applications in order to perform functions listed in 3.1.1.

2—Communication channels and data transfer protocols that provide for information exchanges between the external communications subsystem and outside information systems in order to perform functions listed in 3.1.6.

3, 4, 5, 6, 7—Communication channels and data transfer protocols that provide for information exchanges between the components of the System in order to perform functions listed in 3.1.2.-3.1.5.

4. Unique Features of the System 4.1. STERS uses the "secret sharing" principle based on a generalized mathematical model of an asymmetrical algorithm for cryptographic transformation of data to achieve the following:

4.1.1. Provide higher data security to protect them from hacking or unauthorized access through physical separation of locations (hardware-software complexes) where cryptographic keys are stored.

4.1.2. Guarantee that rights transfer occurs only once, i.e., the data are deleted and/or made impossible to be used again after the transfer.

4.1.3. Guarantee that tokenization can be carried out, i.e., that the right of disposal for an Asset can be granted to a person who will be able to present both halves of the Token's private key in the future, in return for the right of disposal for the Token.

4.1.4. Guarantee that tokenization can be reversed, i.e., the right of disposal for an asset can be seized by the person who presents both halves of the Token's private key, in return for redemption of the Token and forfeiting of all rights associated with it.

4.2. "Secret sharing" usually means various methods of sharing the "secret" (i.e., key) among the members of a group, wherein a certain number of the members is required to reconstruct the secret.

4.3. "Secret sharing" in STERS is based on a generalized mathematical model of an asymmetrical algorithm for cryptographic transformation of data.

Let $\circ$ be a group binary operation for existing public key cryptographic algorithms for conversion of data defined over a finite group, ring, or field of algebraic or algebra-geometric objects (integers, coordinates of points on an algebraic curve, lattice elements, etc.). Let $G=\{g_0, g_1, \ldots, g_{n-1}\}$ be one of these sets, and n be its order with a cryptographic complexity. Then, let a cryptographic transformation over G be a multiple repetition of the elementary operation $\circ$ or exponentiation of an element of the set G, i.e., $$g_i = \underbrace{(g_j \circ g_j \circ g_j \circ \ldots \circ g_j)}_{r} = g_j^{(r)},$$

where $g_i, g_j \in G$. In additive groups, e.g., a group of points on an elliptic curve, such exponentiation can be interpreted as a point-scalar multiplication. It is obvious, then, that each particular cryptographic system is defined by function $\varphi(g_{gen}): G \to G'$, where $G' \in G$, and $g_{gen} \in G'$ is a generating element that defines the cryptographic system, i.e., private q and public $g'_{pub}$ keys, where $g'_{pub} = g_{gen}^{(q)}$, $q \in \{0, 1, \ldots, m-1\}$, m is the order of the set $G'$, defined by the order of the element $g_{gen}$. Please note that $m \le n$, where $m=n$ describes a cryptographic system, where function $\varphi$ defines mapping of the set G upon itself, such as RSA cryptographic system, ElGamal encryption for a multiplicative group over prime field), and $m<n$ describes a cryptographic system, where the set $G'$ generated by the generating element does not coincide with and is not a part of G, such as Schnorr signature-based cryptographic system, ElGamal encryption for an additive group of points on an elliptic curve or Hermite curve, NTRUEncrypt.

4.4. The "secret sharing" principle is implemented by using group properties of public key cryptographic systems:

$$g_{gen}^{(q)} = g_{gen}^{(q_1 \cdot q_2)},$$

where q is a private key, $q_1$ is Half 1 of the private key of Participant 1 (client of the System), and $q_2$ is Half 2 of the private key of Participant 2 (System itself).

$$(g_{gen}^{(q_2)})^{(q_1)} = (g_{gen}^{(q_1)})^{(q_2)} = g_{pub},$$

taking into account that $$g_{gen}^{(q_1)} = g_{pub1}, g_{gen}^{(q_2)} = g_{pub2},$$

it follows that $$g_{pub2}^{(q_1)} = g_{pub1}^{(q_2)} = g_{pub},$$

where $g_{pub}$ is a public key corresponding to q;
$g_{pub1}$ is a public key corresponding to $q_1$;
$g_{pub2}$ is a public key corresponding to $q_2$;
where $g_{gen}$ is a generating element that defines the cryptographic system.

Therefore, based on 4.1-4.4 it means that, the "secret sharing" principle and methods of its utilization (algorithms of applications) is innovatively used for procurement of the following functions of STERS:

Secured Tokenization of Assets and its reversibility.

Distributed storage of Tokens and information on tokenized Assets by both the System and its users, which is more secured (i.e., protected from unauthorized access or modification) than other solutions for distributed data storage.

Guaranteed execution of various disposal transactions with Tokens and their underlying tokenized Assets by and between the System users.

The unique features of the present System make it a perfect foundation for a variety of electronic solutions that service civil circulation or relations between states or supra-national entities, including all sorts of fintech solutions (payment systems, exchange systems, money transfer systems, etc.), crypto-currency-based solutions using block-chain technologies, block-chain-based solutions for storing and processing information (including all sorts of smart contract systems), tracking and rights monitoring systems for issuing of securities or payment tools (both state and non-state), systems for tracking and storing information on civil states of subjects and objects of law.

Solutions that are based on the present System may utilize both all its unique features and only some of them, which are applicable and necessary for a specific application to provide the required functionality.

Figure 3:
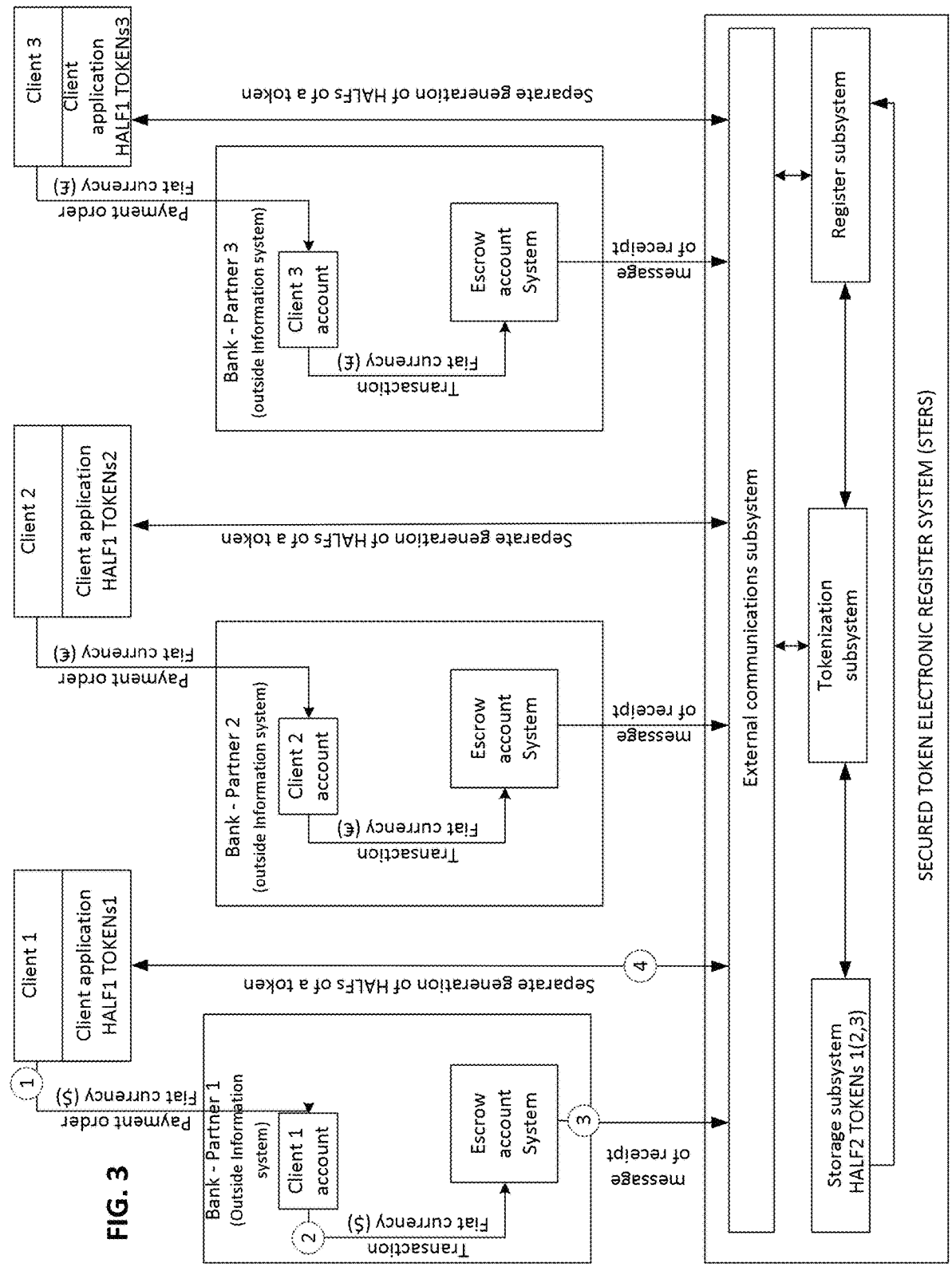
FIG. 3 illustrates shows a diagram of fiat money tokenization by the system participants.

5. Exemplary Practical Applications of the System 5.1. FIG. 3 shows a diagram of fiat money tokenization by the System participants.

Diagram key for this figure is as follows:

Bank-Partner 1 (2, 3)—Top-class banks, where the System has one or more escrow accounts in local currency and/or reserve currencies.

Client 1 (2, 3)—Non-banking organizations or individuals, participants of the System that transfer money to escrow accounts in Bank-Partners in order to Tokenize them in the System.

5.2. Fiat money tokenization algorithm

Step 1—Client 1 gives an instruction for transferring fiat money (for example USD) from his account to the escrow account of the System to the Bank-Partner1.

N.B. The scheme is simplified. In reality the account of the Client should not necessarily be in the same bank with the escrow account of the System and then there may be an arbitrary number of intermediary/correspondent banks/fiat payment systems involved. But the escrow account of thr System in Bank-Partner 1 must be the one receiving the money.

Step 2—Bank-Partner 1 processes said instruction and books the transfer of fiat money from the Client 1's account to the escrow account of the System.

Step 3—After fiat money have been booked at the escrow account of the System, Bank-Partner 1 duly notifies the System, e.g. via application programming interface (API).

Step 4—The System analyzes the Bank-Partner 1's notification about the fiat money transfer to the escrow account (said notification may contain the amount and currency of transaction, as well as other unique data that are required to confirm the Client's 1 instruction for Tokenization). If the data are valid, the System, together with Client 1 application, generates the necessary number of token halves.

Corresponding entries regarding the quantity, attributes and the bearer of the newly generated tokens are created in the Register subsystem. If the System has a dedicated storage, the second half of each new Token is sent there.

The process is the same for Client 2, 3 and Bank-Partner 2, 3, just different fiat currencies are used (for instance, EUR and GBP).

Figure 4:
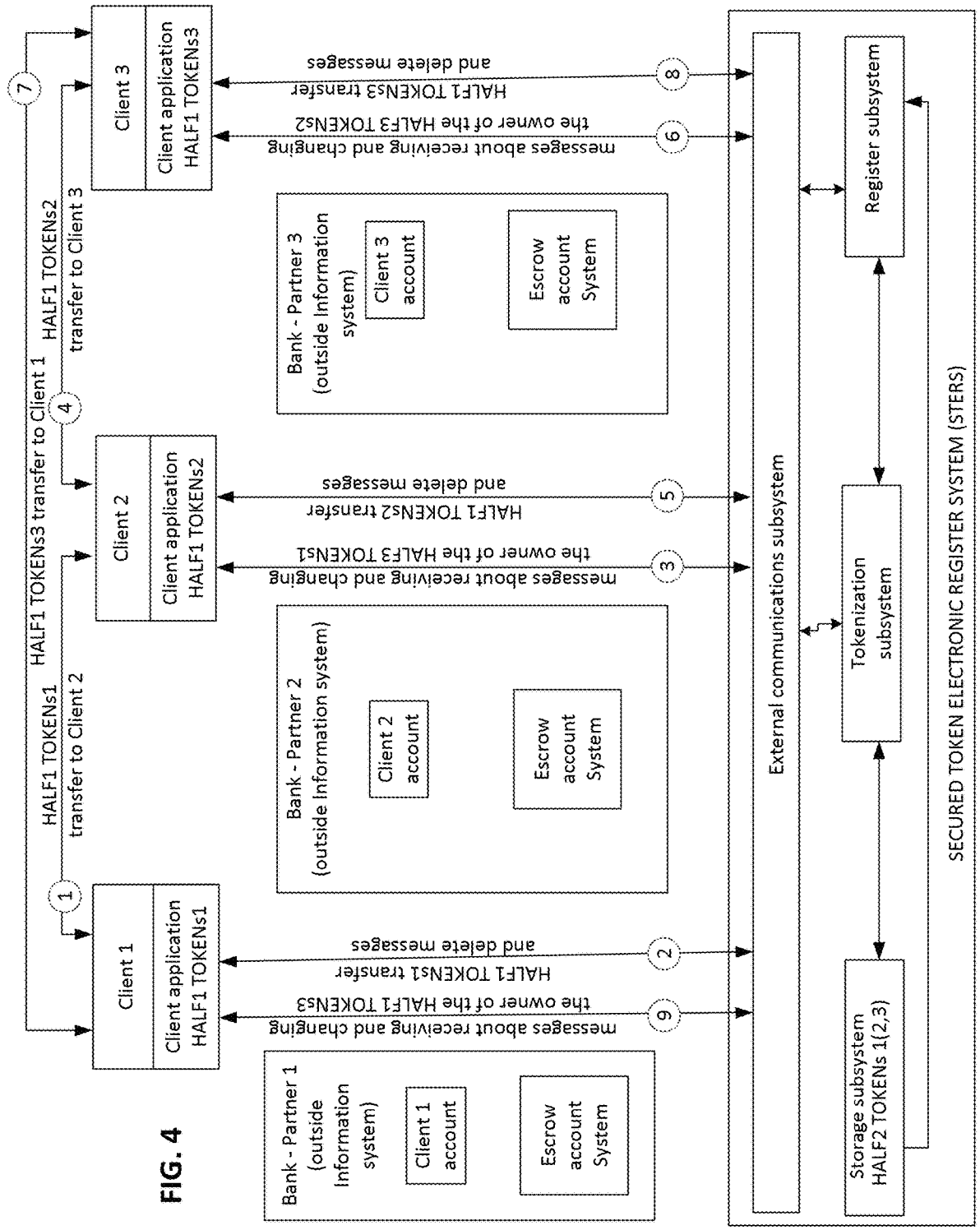
FIG. 4 illustrates shows a diagram of transactions between the System participants using tokenized fiat money.

5.3. FIG. 4 shows a diagram of transactions between the System participants using tokenized fiat money.

Diagram key is as follows:

Bank-Partner 1 (2, 3)—Top-class banks, where the System has one or more escrow accounts in local currency and/or reserve currencies.

Client 1 (2, 3)—Non-banking organizations or individuals, participants of the System that bear Tokens (with Tokenized fiat currencies as an underlying asset).

Transactions between the participants of the System (changing token ownership) are carried out without involvement of Bank-Partner 1 (2, 3).

Client 1 passes their tokens (tokenized USD) over to Client 2, who, in turn, passes their original tokens (tokenized EUR) over to Client 3, who passes their original tokens (tokenized GBP) over to Client 1. All private key data transfers are conducted peer-to-peer between Clients in order to preserve the principle of non-storing the half private keys in the same storage.

5.4. Algorithm for transactions using tokenized fiat money

Step 1—Client 1 sends their half of the private token (HALF1 TOKENs1) to Client 2, with notification upon reception.

Step 2—Client 1 notifies the System that they have sent their half of the private key (HALF1 TOKENs1) to Client 2.

Step 3—Client 2 notifies the System that they have received the half of the private key (HALF1 TOKENs1), whereas the System notifies Client 2 that they are now the token bearer.

At the end of Step 3, after the System received the confirmation from the Client 2, the System sends back a notification on token bearer change to the Client 1, thereby completely deleting said half of the private key (HALF1 TOKENs1) from the Client's 1 storage.

Steps 4-9 describe the same procedure regarding transfer of HALF1 TOKENs2 from Client 2 to Client 3, and transfer of HALF1 TOKENs3 from Client 3 to Client 1.

5.5 Redemption

Figure 5:
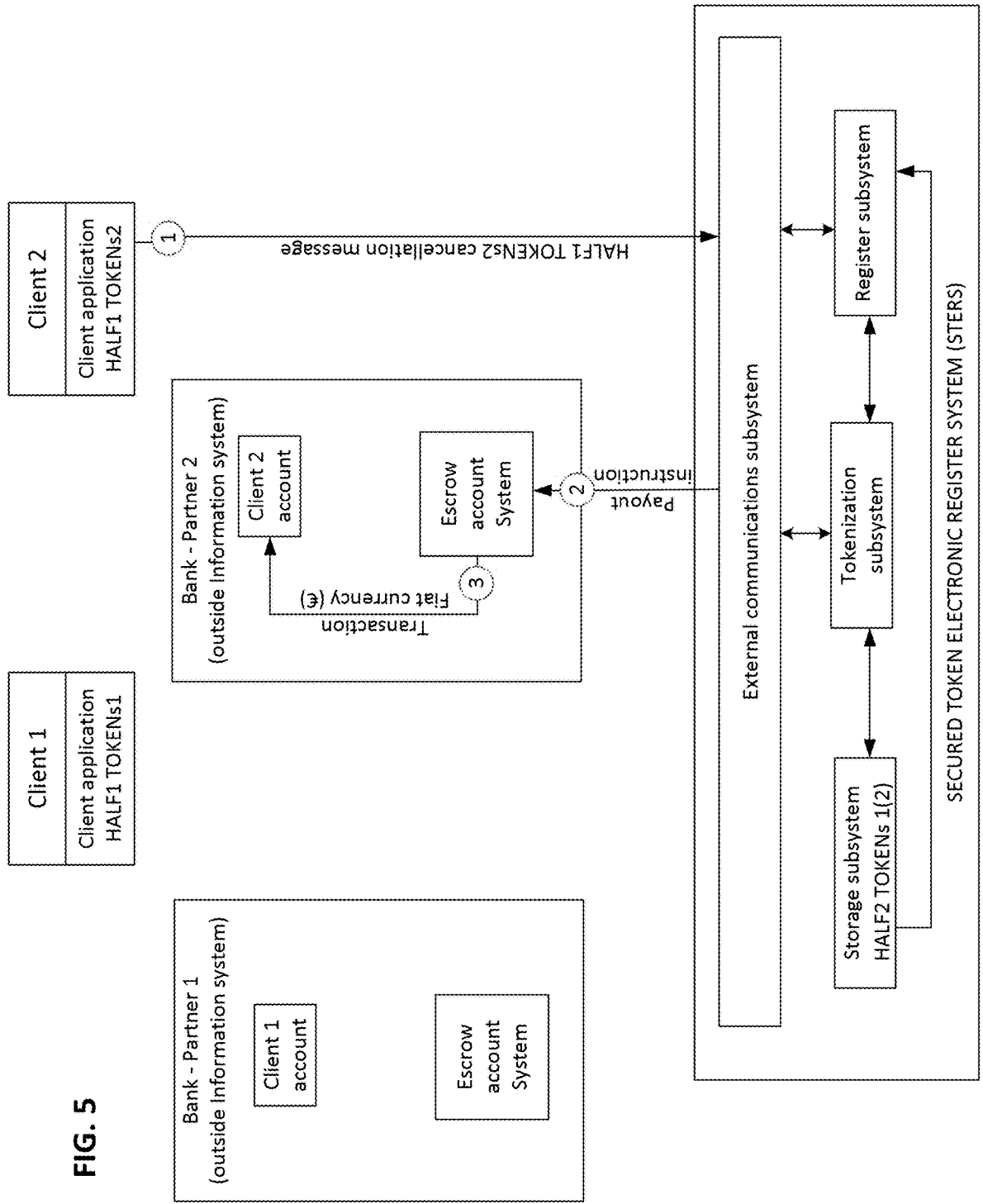
FIG. 5 shows a diagram of redemption of tokenized fiat money.

FIG. 5 shows a diagram of redemption of tokenized fiat money.

Diagram key:

Bank-Partner 1 (2)—Top-class banks, where the System has one or more escrow accounts in local currency and/or reserve currencies.

Client 1 (2)—Non-banking organizations or individuals, participants of the System that bear Tokens (with Tokenized fiat currencies as an underlying asset).

Client 2 redeems their tokens, by transferring fiat money from an escrow account of the System to his account in Bank-Partner (or elsewhere).

5.6 Redemption algorithm for tokenized fiat money

Step 1—Client 2 notifies the System that his Token has to be redeemed.

Step 2—The System instructs the Bank 2 (holding the escrow account) to transfer the money from System's escrow account to the Client 2's account. As soon as this instruction is authorized and accepted by the Bank the System deletes the second half of the private key of the token (HALF2 TOKENs2) and responds with its own notification to Client 2 and Client's 2 application also deletes the first half of the private key of the token (HALF1 TOKENs2).

Step 3—Bank-Partner 2 processes the money transfer instruction received from the System, transferring fiat money from the System's escrow account to the Client 2's account.

5.7 Interbank settlements

Figure 6:
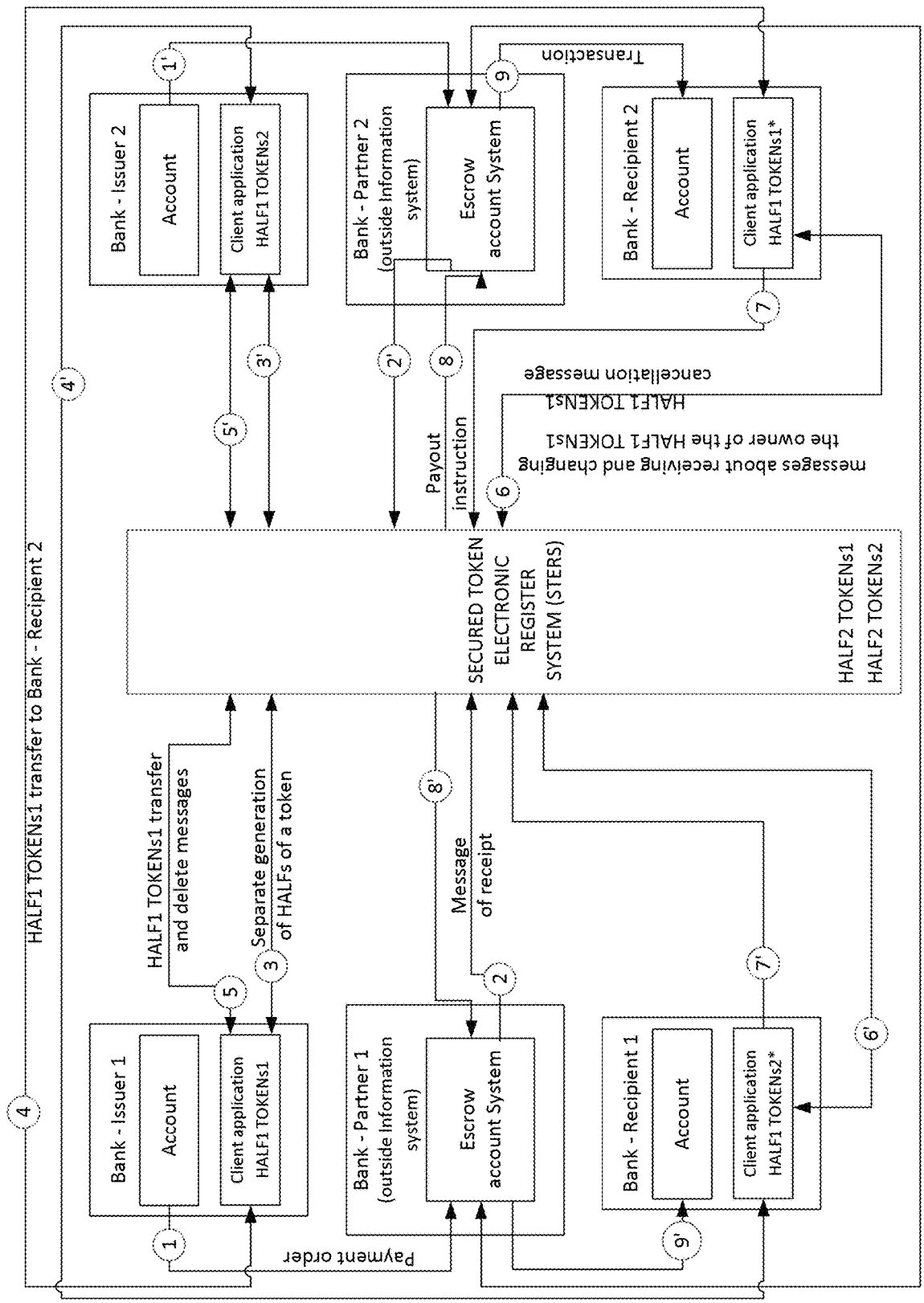
FIG. 6 shows a diagram of interbank settlements.

FIG. 6 shows a diagram of interbank settlements

Diagram key is as follows:

Bank-Partner 1 (2)—Top-class banks, where the System has one or more escrow accounts in local currency and/or reserve currencies.

Bank Issuer 1 (2)—Banks transferring money to escrow accounts in order to tokenize them in the System. May also act as Bank-Partners.

Bank-Recepient 1 (2)—Banks participating in the System. May also act as Bank-Partners.

A bank or a group of banks reserve their assets (fiat money, precious metals, securities, etc.) on escrow accounts of the System securing said assets for Tokenization. These newly generated secured Tokens can be used for interbank settlements, or they can be redeemed (removed from the System), i.e. converted into the original underlying assets, if necessary.

5.7 Interbank settlement algorithm

Step 1—Bank Issuer 1 transfers fiat money from its account to the escrow account of the System in Bank-Partner 1.

Step 2—After fiat money have been received by Bank-Partner 1 and put on the escrow account of the System, Bank-Partner 1 duly notifies the System of that fact.

Step 3—The System analyzes the Bank-Partner 1's notification of the fact that fiat money have been put on the escrow account. In case the data provided are valid, the System, together with the Bank Issuer 1's client app, generates the necessary number of Tokens.

Step 4—Bank Issuer 1 sends its half of the private key (HALF1 TOKENs1) to Bank-Recepient 2, whereas Bank-Recepient 2 duly notifies Bank Issuer 1 upon reception.

Step 5—Bank Issuer 1 notifies the System that its half of the private key (HALF1 TOKENs1) has been sent to Bank-Recepient 2.

Step 6—Bank-Recepient 2 notifies the System that it has received said half of the private key (HALF1 TOKENs1), whereas the System notifies Bank-Recepient 2 that it has become the token bearer and thereby confirms token ownership change and completely removes the half of the private key that has been sent (HALF1 TOKENs1) from from the Bank Issuer 1 client application storage.

Step 7—Bank-Recepient 2 notifies the System of token redemption, whereas the System duly confirms it.

Step 8—The System instructs the bank to conduct a payment from its escrow account to Bank-Recepient 2's account and as soon as this instruction is authorized and accepted by the Bank-Partner 2 deletes the second half of the token private key (HALF2 TOKENs1) and sends notification to Bank-Recepient 2's application, which also deletes the first half of the token private key (HALF1 TOKENs1).

Step 9—Bank-Partner 2 processes the payment instructions that have been received from the System and conducts the fiat money transfer from the escrow account of the System to the account in Bank-Recepient 2.

Within a stipulated period of time, escrow accounts at Bank-Partner 1 and Bank-Partner 2 are balanced by the instructions of the System.

It should be understood that described algorithm may also be extended over cross-border transfers involving different currencies. This will involve fiat currency exchange operations. However, for the purpose of simplified example of usage of a Tokenized fiat such opportunity is not covered in details.

Steps 1'-9' describe the same procedure, but in reverse, i.e. transfer of HALF1 TOKENs2 from Bank Issuer 2 to Bank Recipient 1 and redemption of the token in Bank-Partner 1.

5.8 cryptocurrency tokenization

Figure 7:
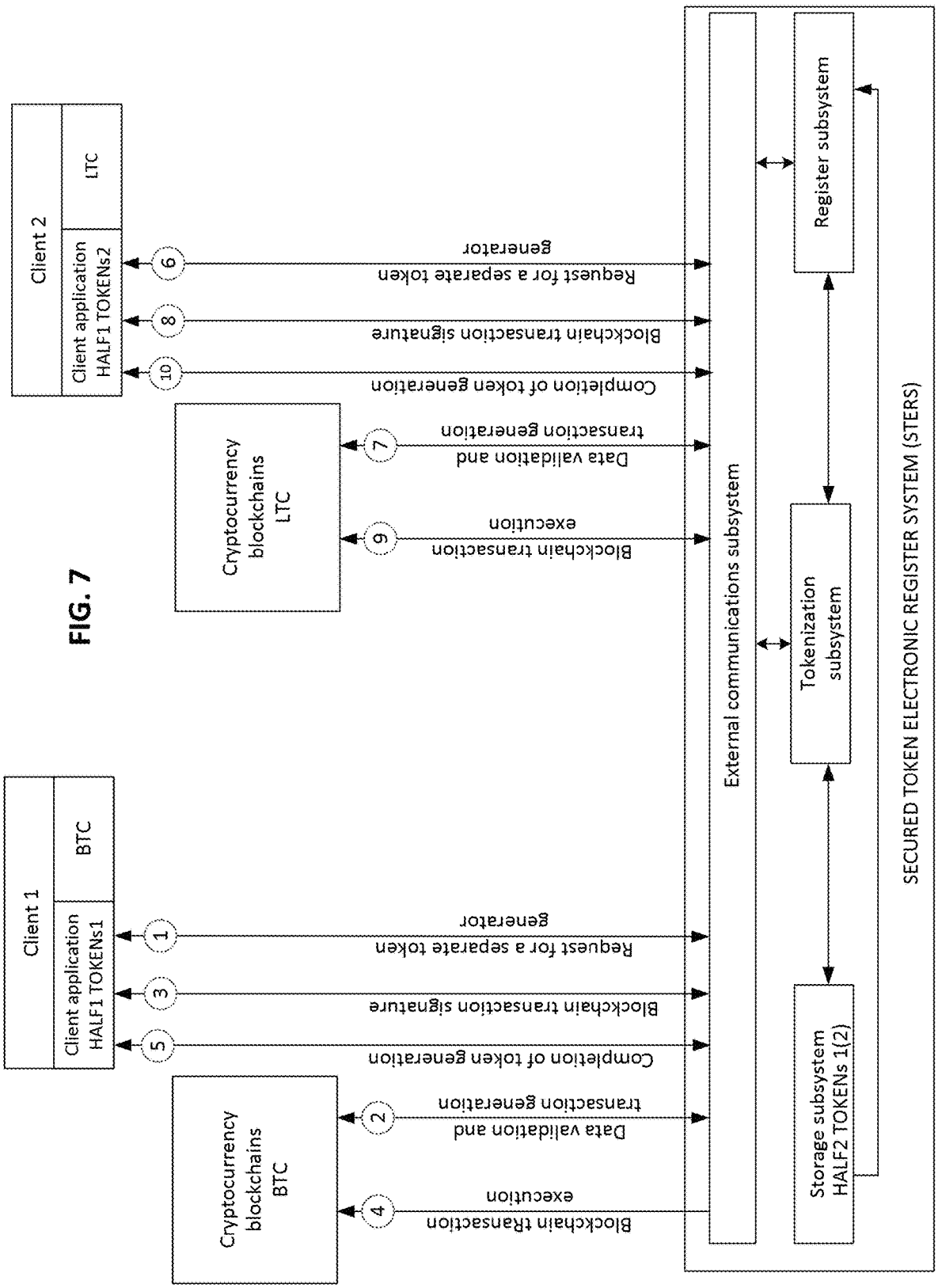
FIG. 7 shows a diagram of cryptocurrency tokenization by the system participants.

FIG. 7 shows a diagram of cryptocurrency tokenization by the System participants Diagram key is as follows:

Client 1 (2)—Participants of the System tokenizing their cryptocurrencies—BTC and LTC correspondingly.

Crypto-currency block-chains 1 (2)—Distributed cryptocurrency transaction databases—BTC and LTC correspondingly.

5.9 Cryptocurrency Tokenization Algorithm

Step 1—Client 1 starts tokenizing a certain quantity of bitcoins in their possession, sending a notification to the System. The System exchanges data with Client 1, the data required to generate the halves of token private keys. Said halves are generated separately, but before any transactions are carried out in block-chains, the newly generated tokens are not registered in the System (i.e. they are not backed with rights and have "empty" technical representation).

Step 2—The System checks the data provided by Client 1 in block-chain and generates a transaction for transferring bitcoins from the cryptocurrency address of Client 1 to different addresses that correspond to the newly generated Tokens.

Step 3—Client 1 signs the transaction generated by the System and authorizes transfer of bitcoins in block-chain.

Step 4—The System passes the transaction that has been signed by Client 1 over to the blockchain and waits for it to be completed. After the, bitcoins are transferred in blockchain from the crypto-currency address of Client 1 to the addresses that correspond to the newly generated Tokens (required number of confirmation received by the System) the transaction is deemed completed.

Step 5—The System registers Client 1's rights of disposal for the newly generated Tokens allowing them to perform transactions with said Tokens. Client 1 is duly notified of this fact.

Steps 6-10 describe the same procedure to be followed by Client 2 for Litecoins.

Figure 8:
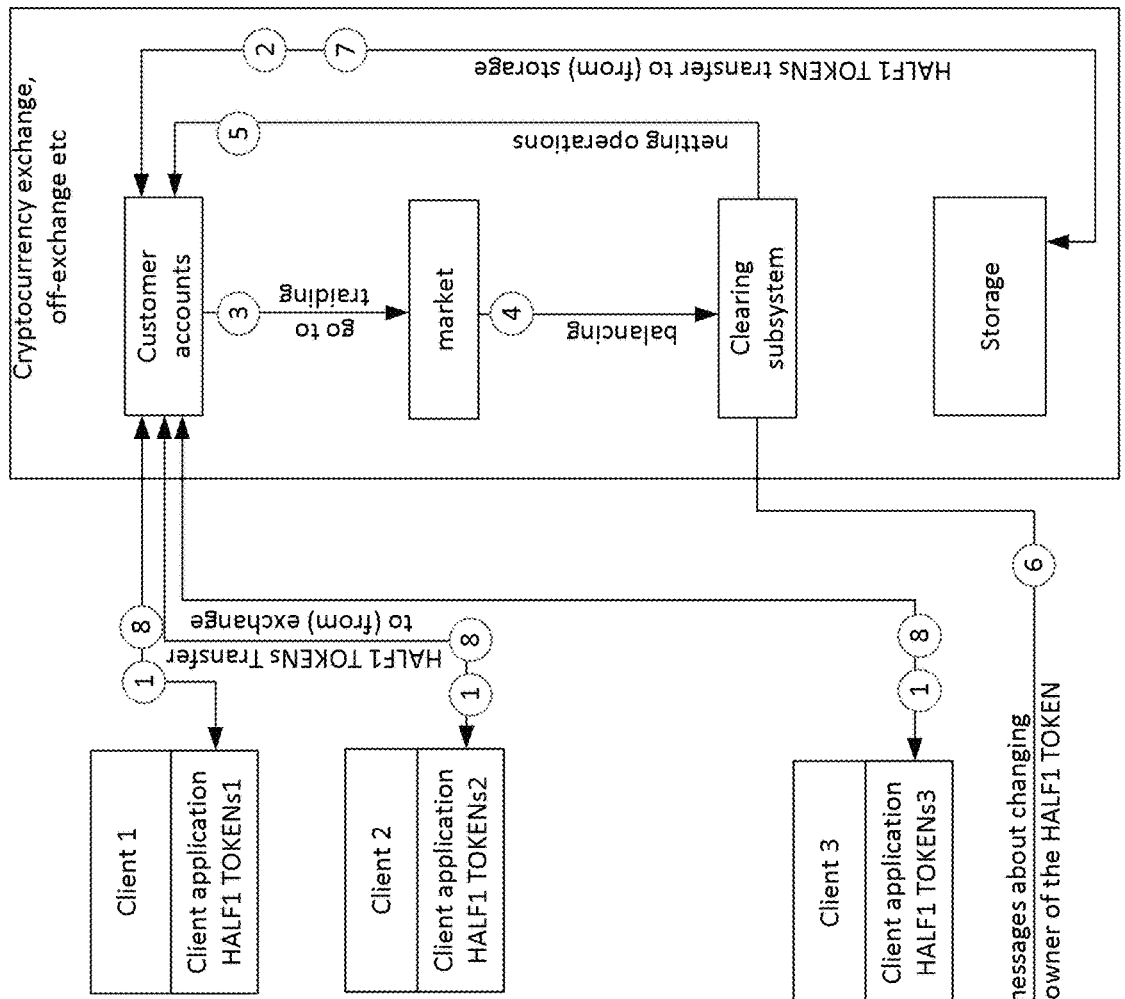
FIG. 8 shows a diagram of exchange trade between the System participants using tokenized crypto-currencies.
Figure 8:
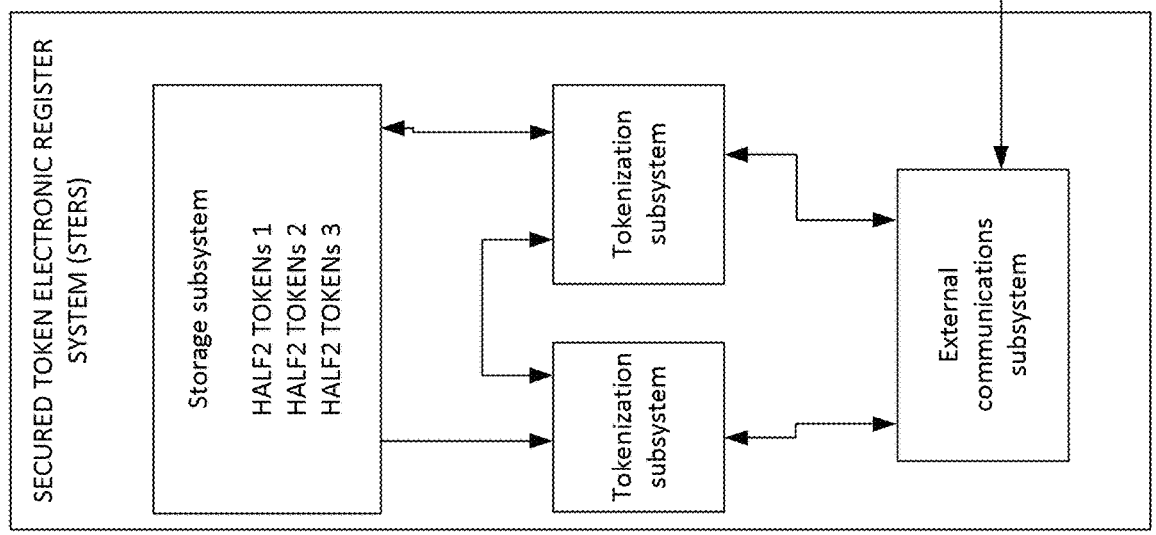

5.8 Exchange trade between the System participants using tokenized cryptocurrencies FIG. 8 shows a diagram of exchange trade between the system participants using tokenized crypto-currencies Diagram key for this figure is as follows:

Cryptocurrency exchange, over-the-counter (OTC), etc.—an electronic platform, participant of the System providing exchange and OTC transaction services.

Client 1 (2, 3)—System participants bearing Tokens (particularly for this example, tokenized crypto-currencies, but could be any other types of underlying assets).

5.9 Exchange trade algorithm using tokenized cryptocurrencies (or any other assets)

Step 1—Client 1 (2, 3) send their halves of Token private keys to the trading platform.

Step 2—In case the trading platform has its own dedicated storage, then said halves of token private keys are sent there.

Step 3—Client 1 (2, 3) go on to participate in trading.

Step 4—The information about the deals conducted is sent to the clearing system of the trading platform.

Step 5—The clearing system, with a pre-set frequency, carries out mutual offsets for clients' accounts based on the trading balance.

Step 6—The clearing system sends to STERS the information on Token ownership changes in the course of trading to the System.

Steps 7-8—When Token is being withdrawn from the trading platform, it gives Client 1 (2,n) their halves of Token private keys back, taking into account the trading results.

Figure 9:
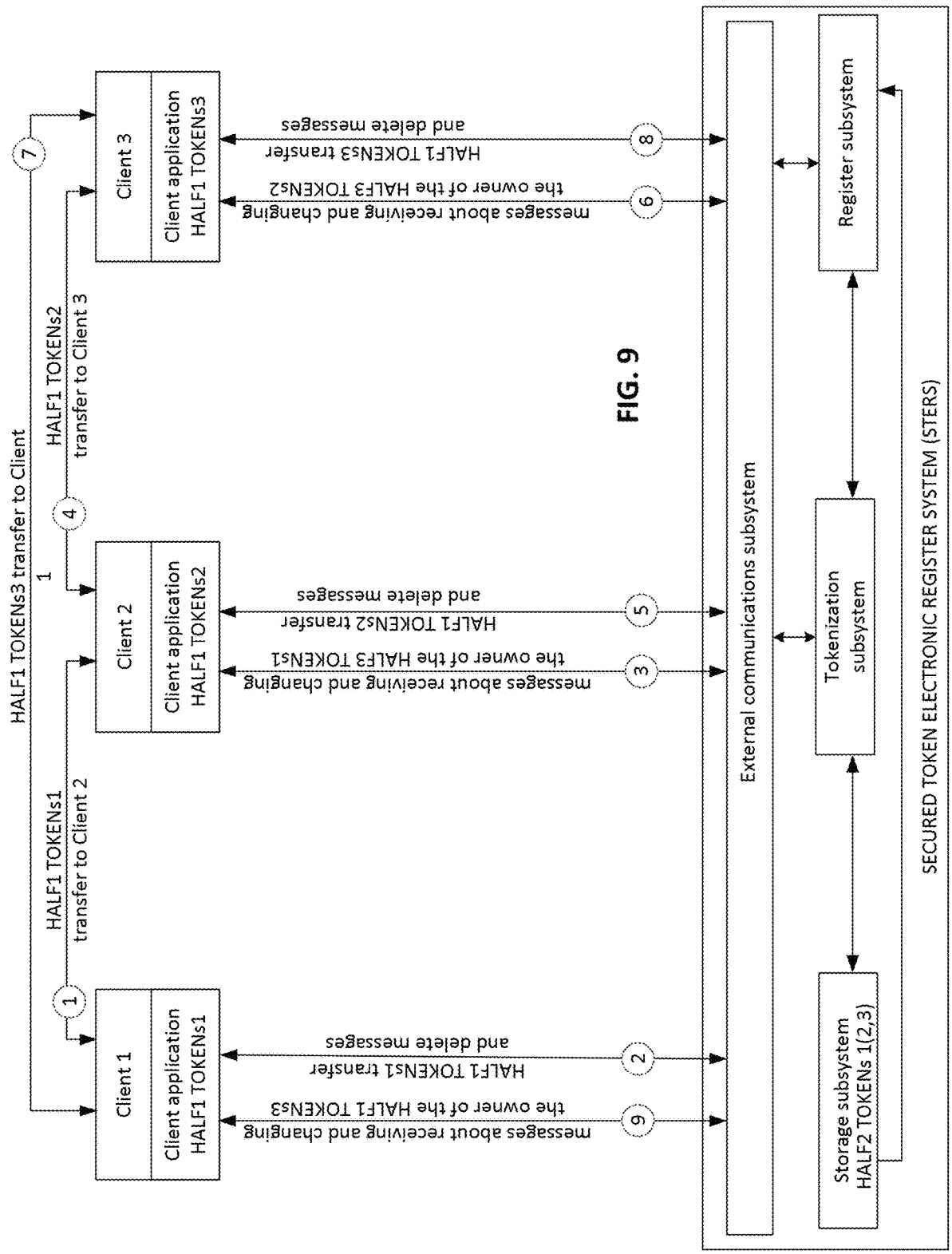
FIG. 9 shows a diagram of a payment system using Tokenized crypto-currencies (more generally, Tokenized Assets)

5.9 payment system using Tokenized crypto-currencies 5.10 payment system using Tokenized crypto-currencies FIG. 9 shows a diagram of a payment system using tokenized crypto-currencies (more generally applicable to any other Tokenized Assets)

Diagram key for this figure is as follows:

Client 1 (2, 3)—System participants bearing Tokens (Tokenized crypto-currencies).

Client 1 passes their tokens over to Client 2, who, in turn, passes their original tokens over to Client 3, who passes their original tokens over to Client 1.

5.11 Algorithm for transactions in a ayment system using Tokenized crypto-currencies Step 1—Client 1 peer-to-peer sends their half of the private token (HALF1 TOKENs1) to Client 2, with notification upon reception.

Step 2—Client 2 notifies the System that they have received their half of the private key (HALF1 TOKENs1) to Client 2, whereas the System sends back a notification on token bearer change, completely deleting said half of the private key (HALF1 TOKENs1) from the storage of Client 1.

Step 3—Client 2 notifies the System that they have received the half of the private key (HALF1 TOKENs1), whereas the System notifies Client 2 that they are now the token bearer.

Steps 4-9 describe the same procedure regarding transfer of HALF1 TOKENs2 from Client 2 to Client 3, and transfer of HALF1 TOKENs3 from Client 3 to Client 1.

Figure 10:
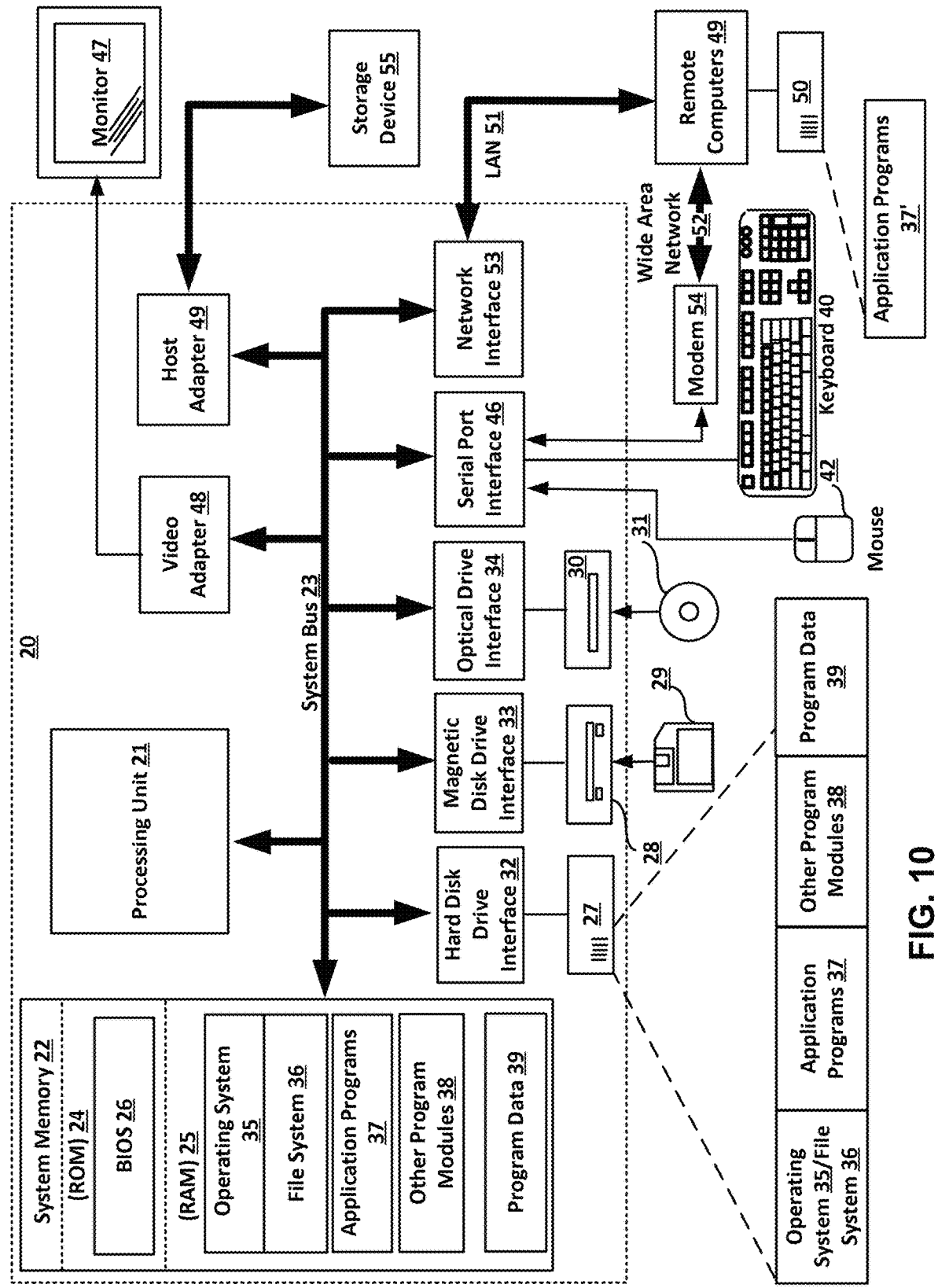
FIG. 10 shows an exemplary system for implementing the invention includes a general purpose computing device.

With reference to FIG. 10, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for generating tokens for transactions involving an asset, the method comprising:
    identifying an asset that can be traded or exchanged in digital form;
    using a secret sharing algorithm, creating a token that corresponds to the asset, wherein the token represents a token private key and comprises a first half of a private key of a client and a second half of a private key of a server;
    on the client side, generating a first half of a public key of the client and a first half of the private key of the client;
    transmitting the first half of the public key of the client to the server;
    on the server, using the first half of the public key of the client to generate a second half of a private key of the server;
    generating the second half of the public key of the server using the second half of the private key of the server;
    upon entry of the asset into a system database, associating the asset with the token, such that access to the asset requires the first half and the second half of the private key of the server;
    performing a transaction with the asset by transferring the first half of the private key of the client from a first user to a second user, and changing an association of the asset from the first user to the second user,
    wherein the first half of the private key of the client is never stored together with the second half of the private key of the server,
    wherein each asset corresponds to a database entry matching the token, such that a public key of the token is used to query the database about properties of the asset, and
    wherein the public key of the token is generated by multiplying the second half of the private key of the server by the first half of the public key of the client or by multiplying the first half of the private key of the client by the second half of the public key of the server.

2. The method of claim 1, further comprising using the public key of the token to verify information about the asset.

3. A system for generating tokens for transactions involving an asset, the system comprising:
    a client application running on a client device;
    a server running a database of assets and a tokenization subsystem;
    an operations registry;
    the server identifying an asset that can be traded or exchanged in digital form;
    using a secret sharing algorithm, the system creating a token that corresponds to the asset, wherein the token represents a token private key and comprises a first half of a private key of the client and a second half of a private key of the server;
    a client application generating a first half of a public key of the client and a first half of the private key of the client;
    transmitting the first half of the public key of the client to the server;
    the tokenization system using the first half of the public key of the client to generate a second half of the private key of the server;
    the tokenization system generating the second half of the public key of the server using the second half of the private key of the server;
    upon entry of the asset into the database, the tokenization system associating the asset with the token, such that access to the asset requires the first half and the second half of the token private key; and
    the system performing a transaction with the asset and storing the transaction in the operations registry, by transferring the first half of the private key of the client from a first user to a second user, and changing an association of the asset from the first user to the second user,
    wherein the first half of the private key of the client is never stored together with the second half of the private key of the server,
    wherein each asset corresponds to a database entry matching the token, such that a public key of the token is used to query the database about properties of the asset, and
    wherein the public key of the token is generated by multiplying the second half of the private key of the server by the first half of the public key of the client or by multiplying the first half of the private key of the server by the second half of the public key of the client.

4. A method for generating tokens for transactions involving an asset, the method comprising:
    identifying an asset that can be traded or exchanged in digital form;
    using a secret sharing algorithm, creating a token that corresponds to the asset, wherein the token represents a private key q and comprises a first half $q_1$ and a second half $q_2$;
    on the client side, generating a first half $g_{pub1}$ of a public key $g_{pub}$ and the first half $q_1$ of the private key q;
    transmitting the first half $g_{pub1}$ to a server;
    on the server, using the first half $g_{pub1}$ of the public key $g_{pub}$ to generate the second half $q_2$ of the public key $g_{pub}$;
    generating the second half $g_{pub2}$ of the public key $g_{pub}$ using the second half $q_2$,
    wherein the secret sharing algorithm uses group properties of public key cryptographic systems $$g_{gen}^{(q)} = g_{gen}^{(q_1 \cdot q_2)},$$

$$(g_{gen}^{(q_2)})^{(q_1)} = (g_{gen}^{(q_1)})^{(q_2)} = g_{pub},$$

with $$g_{gen}^{(q_1)} = g_{pub1}, g_{gen}^{(q_2)} = g_{pub2},$$

and $$g_{pub2}^{(q_1)} = g_{pub1}^{(q_2)} = g_{pub},$$

where $g_{gen}$ is a generating element that defines the cryptographic system;
    upon entry of the asset into a system database, associating the asset with the token, such that access to the asset requires the first half $q_1$ and the second half $q_2$ of the private key q;
    performing a transaction with the asset by transferring the first half $q_1$ of the private key q from a first user to a second user, and changing an association of the asset from the first user to the second user,
    wherein the first half $q_1$ of the private key q is never stored together with the second half $q_2$ of the private key q.

* * * * *